United States Patent
Iwamoto et al.

(10) Patent No.: US 8,748,026 B2
(45) Date of Patent: Jun. 10, 2014

(54) INFORMATION-PROCESSING EQUIPMENT

(75) Inventors: Akira Iwamoto, Osaka (JP); Masaru Furujiku, Osaka (JP)

(73) Assignee: Panasonic Corporation, Osaka (JP)

( * ) Notice: Subject to any disclaimer, the term of this patent is extended or adjusted under 35 U.S.C. 154(b) by 443 days.

(21) Appl. No.: 12/888,468

(22) Filed: Sep. 23, 2010

(65) Prior Publication Data

US 2011/0076523 A1    Mar. 31, 2011

(30) Foreign Application Priority Data

Sep. 28, 2009 (JP) ................. 2009-222212

(51) Int. Cl.
*H01M 2/10* (2006.01)

(52) U.S. Cl.
USPC ............. 429/100; 429/96; 429/98; 206/703

(58) Field of Classification Search
CPC .......... H01M 2220/30; H01M 2/0217; H01M 2/1022
USPC ............. 429/96–100; 206/703–705
See application file for complete search history.

(56) References Cited

U.S. PATENT DOCUMENTS

2006/0068280 A1 *   3/2006   Takeshita et al. ............. 429/179

FOREIGN PATENT DOCUMENTS

JP      2001-266826       9/2001
KR      2004079889 A  *   9/2004

OTHER PUBLICATIONS

Machine translation of KR 10-2004-0079889 A (Kim).*

* cited by examiner

*Primary Examiner* — Raymond Alejandro
*Assistant Examiner* — Helen McDermott
(74) *Attorney, Agent, or Firm* — Wenderoth, Lind & Ponack, L.L.P.

(57) ABSTRACT

Information-processing equipment includes a chassis having a housing section, the housing section including an opening portion for insertion of a battery pack, a back wall opposing a mounting end surface of the battery pack, a pair of side walls opposing a pair of side surfaces of the battery pack, and a ceiling wall opposing a mounting flat surface of the battery pack. The side walls having guide rails to engage slot portions on the side surfaces and to guide insertion of the battery pack. The guide rails engaging the slot portions, such that, until the amount of insertion of the battery pack reaches a predetermined value, a predetermined gap is ensured between the mounting flat surface and the ceiling wall, and when the amount of insertion of the battery pack has reached the predetermined value, the mounting flat surface is closer to the ceiling wall to eliminate the gap.

3 Claims, 6 Drawing Sheets

INFORMATION-PROCESSING EQUIPMENT

BACKGROUND OF THE INVENTION

I. Technical Field

The present invention relates to portable information-processing equipment, such as a laptop personal computer (hereinafter called "laptop PC" as an abbreviated expression, appropriately), and more specifically relates to a battery-pack housing structure for such information-processing equipment.

II. Description of the Related Art

As is well known, in general, portable information-processing equipment, such as laptop PCs, can be driven by electricity supplied thereto from rechargeable batteries. In cases where a battery pack constituted by such batteries which are unitized, is mounted and housed in information-processing equipment, generally, the chassis for the main body of the information-processing equipment is partially cut away in a concave shape at the bottom portion and a side portion thereof to form a housing section, such that the battery pack can be inserted into the housing section from the side of the chassis and can be housed therein. Further, the battery pack can be removed therefrom, by pulling it out in an opposite direction. Further, such a battery pack is generally formed to basically have a substantially-rectangular parallelepiped shape in its entirety, and the battery-pack housing section is further formed to have a concave shape which conforms thereto.

In order to insert and pull a battery pack into and from a housing section as easily and certainly as possible, Japanese Patent Laid-open Publication No. 2001-266826 discloses a structure which provides protruding portions extending in the direction of insertion on left and right side surfaces of a battery pack and, further, provides guide slots extending in the direction of insertion in left and right side walls of a housing section, such that the protruding portions engage with the guide slots for enabling inserting/pulling the battery pack into and from the housing section. With this structure, it is possible to stably guide a terminal included in the battery to a terminal included in the housing section. It is to be noted that, in the present specification, the term "inserting/pulling" means "inserting or pulling" and is used for simply indicating them.

In cases of structures as the conventional structure, in general, the battery pack is inserted/pulled into and from the housing section, while the upper flat surface portion (the mounting flat surface portion) of the battery pack which opposes to the housing-section ceiling wall portion, out of the upper and lower flat surface portions of the battery pack, is slid against the housing-section ceiling portion (namely, while they rub against each other), and while the battery pack is guided by the guide mechanism constituted by the protruding portions and the guide slots.

In cases where the battery pack is inserted/pulled thereinto and therefrom while the mounting flat surface portion of the battery pack is slid against the ceiling wall portion of the housing section (namely, while they rub against each other), there is a possibility to induce excessively-large sliding resistances in inserting/pulling the battery pack thereinto and therefrom due to dimension tolerances in respective portions, which may make it hard to smoothly insert/pull it, thereby degrading the operability in inserting/pulling the battery pack.

Further, if the battery pack is repeatedly inserted/pulled at states where there are such large sliding resistances, this will induce degradation of the surface state, such as the occurrences of surface damages in the mounting flat surface of the battery pack and the ceiling wall surface of the housing section, which is not preferable. In such cases, problems as follows may be induced. For example, in cases where a coating is applied to the mounting flat surface, the coating may be exfoliated, and in cases where a nameplate of the battery pack is attached to the mounting flat surface or in cases where nameplate information is printed thereon, the indication thereof may be scraped to be hard to see.

In order to address these problems, it is possible to conceive provision of a slight gap between the mounting flat surface of the battery pack and the ceiling wall portion of the housing section. However, the provision of such a gap will facilitate the occurrence of "fluttering" in the battery pack at a state where it is housed, which will induce disadvantages in attaining a stable housing state. This will facilitate the occurrence of wear in the connecter portion for establishing electric connection, thereby inducing the problem of the occurrence of contact failures.

SUMMARY OF THE INVENTION

Therefore, it is a basic object of the present invention to enable smoothly inserting/pulling a battery pack into and from a housing section while ensuring a state where the battery pack is stably housed therein and, also, to suppress the damage of the surface conditions of the mounting flat surface of the battery pack and the ceiling wall surface of the housing section, even if the battery pack is repeatedly inserted/pulled thereinto and therefrom.

In order to achieve the purpose, according to the present invention, there is provided an information-processing equipment which includes a chassis having a housing section for detachably housing, therein, a battery pack having a substantially-rectangular parallelepiped basic shape in its entirety. The housing section is formed to include an opening portion for enabling inserting the battery pack from a side of the chassis, a back wall which corresponds to a mounting end surface of the battery pack, a pair of side walls which correspond to a pair of side surfaces of the battery pack, and a ceiling wall which corresponds to a mounting flat surface of the battery pack, by partially cut away the chassis at a bottom portion and a side portion thereof. Also, each of the side walls of the housing section is provided with a guide means for guiding operations for inserting the battery pack, the guide means being adapted to engage with a guided portion provided on the side surfaces of the battery pack for guiding an operation for inserting the battery pack. And further, the guide means is adapted to engage with the guided portion for guiding an operation for inserting the battery pack, such that, until the amount of insertion of the battery pack reaches a predetermined value, a predetermined gap is ensured between the mounting flat surface of the battery pack and the ceiling wall of the housing section, and when the amount of insertion of the battery pack has reached the predetermined value, the mounting flat surface is closer to the ceiling wall to eliminate the gap.

According to the present invention, when the battery pack is inserted into the housing section, the operation for inserting the battery pack thereinto is guided, such that, until the amount of insertion of the battery pack therein reaches a predetermined value, a predetermined gap is ensured between the mounting flat surface of the battery pack and the ceiling wall of the housing section and, when the amount of insertion of the battery pack has reached the predetermined value, the mounting flat surface is closer to the ceiling wall to eliminate the gap. Accordingly, when the battery pack is inserted into the housing section, until the amount of insertion thereof reaches the predetermined value, it is possible to certainly prevent the mounting flat surface of the battery pack from rubbing against the ceiling wall of the housing section, thereby attaining a smooth inserting operation. Further, when the amount of insertion of the battery pack therein has reached the predetermined value, the mounting flat surface is closer to the ceiling wall to eliminate the gap, which prevents the occurrence of "fluttering" in the state where the battery pack is housed therein, thereby obtaining stable electric connection. Further, when the battery pack is pulled from the housing section, the operation is reversed.

That is, it is possible to smoothly insert/pull the battery pack into and from the housing section while ensuring a state where the battery pack is stably housed therein and, also, it is possible to suppress the damage of the surface conditions of the mounting flat surface of the battery pack and the ceiling wall surface of the housing section, even if the battery pack is repeatedly inserted/pulled thereinto and therefrom.

The information-processing equipment according to the present invention can have an aspect as follows, based on the aforementioned structure. That is, in the information-processing equipment having the structure, more specifically, the guided portion may be a slot portion which is formed in side surfaces of the battery pack to extend in a direction of insertion, and the guide means may be a guide rail which is formed on the side walls of the housing section to extend in the direction of insertion and is adapted to engage with the slot portion; the guide rail may include a first guide portion and a second guide portion. The first guide portion relates to the amount of insertion of the battery pack until the predetermined value is reached, and the second guide portion relates to the amount of insertion of the battery pack after the predetermined value has been reached. And further, the second guide portion has a guide surface for a guided wall of the slot portion, which is set to be positioned closer to the ceiling wall of the housing section by a distance corresponding to the gap, than a guide surface of the first guide portion.

In this case, the guide surface of the second guide portion of the guide rail formed in the side wall portions of the housing section for the guided wall of the slot portion is set to be positioned closer to the ceiling wall portion of the housing section by the distance corresponding to the gap. Accordingly, when the battery pack is inserted into the housing section, the operation for inserting the battery pack thereinto is guided, such that, until the amount of insertion of the battery pack reaches a predetermined value, a predetermined gap is ensured between the mounting flat surface of the battery pack and the ceiling wall of the housing section and, when the amount of insertion of the battery pack has reached the predetermined value, the mounting flat surface portion is closer to the ceiling wall to eliminate the gap.

Also, the information-processing equipment according to the present invention can have an aspect as follows, based on the aforementioned structure. That is, in the information-processing equipment having the aforementioned structure, the guided portion may be a slot portion which is formed in the side surface of the battery pack to extend in a direction of insertion, and the guide means may be a guide rail which is formed on the side walls of the housing section to extend in the direction of insertion and is adapted to engage with the slot portion; the slot portion may include a first guided portion and a second guided portion. The first guided portion relates to the amount of insertion of the battery pack until the predetermined value is reached, and the second guided portion relates to the amount of insertion of the battery pack after the predetermined value has been reached. And further, the second guided portion has a guided wall which is guided by the guide rail, and which is set to be positioned further from the ceiling wall of the housing section by a distance corresponding to the gap, than a guided wall of the first guided portion.

In this case, the guided wall is guided by the guide rail of the second guided portion of the slot portion formed in the side surfaces of the battery pack, and is set to be positioned further from the ceiling wall portion of the housing section by the distance corresponding to the gap, than the guided wall of the first guided portion. Accordingly, when the battery pack is inserted into the housing section, the operation for inserting the battery pack thereinto is guided, such that, until the amount of insertion of the battery pack reaches a predetermined value, a predetermined gap is ensured between the mounting flat surface of the battery pack and the ceiling wall of the housing section and, when the amount of insertion of the battery pack has reached the predetermined value, the mounting flat surface portion is closer to the ceiling wall portion to eliminate the gap.

Also, the information-processing equipment according to the present invention preferably has an aspect as follows, based on the aforementioned structure. That is, in the information-processing equipment having the aforementioned structure, preferably, the guide rail may include a first guide portion and a second guide portion. The first guide portion relates to the amount of insertion of the battery pack until the predetermined value is reached, and the second guide portion relates to the amount of insertion of the battery pack after the predetermined value has been reached. And further, the second guide portion has a guide surface for a guided wall of the slot, which is set to be positioned closer to the ceiling wall of the housing section by a distance corresponding to the gap, than a guide surface of the first guide portion.

In this case, the guide surface of the second guide portion of the guide rail for the guided wall of the slot portion is set to be positioned closer by the distance corresponding to the gap to the ceiling wall of the housing section, than the guide surface of the first guide portion and, further, the guided wall of the second guided portion of the slot portion which is guided by the guide rail is set to be positioned further from the ceiling wall of the housing section by the distance corresponding to the gap, than the guided wall of the first guided portion. Accordingly, when the battery pack is inserted into the housing section, the operation for inserting the battery pack thereinto is guided such that, when the amount of insertion of the battery pack therein has reached the predetermined value, in both the back side and the front side in the direction of insertion of the battery pack, the mounting flat surface is closer to the ceiling wall to eliminate the gap, which realizes a more stable insertion operation and also realizes a state where the battery pack is stably housed therein.

Furthermore, the information-processing equipment according to the present invention can have an aspect as follows, based on the aforementioned structure. That is, in the information-processing equipment having the aforementioned structure, a nameplate of the battery pack can be attached or nameplate information thereof can be printed on the mounting flat surface of the battery pack.

In this case, in cases where the nameplate of the battery pack is attached or the nameplate information is printed on the mounting flat-surface portion of the battery pack, even if the battery pack is repeatedly inserted and pulled into and from the housing section, it is possible to suppress the occurrence of inconveniences, such as exfoliation of the nameplate, scrapes of the nameplate information on the nameplate attached to the mounting flat-surface or the nameplate information printed on the mounting flat surface, which would make it hard to see the nameplate information.

BRIEF DESCRIPTION OF THE DRAWINGS

The present invention will be described in detail with reference to the accompanying drawings.

DETAILED DESCRIPTION OF THE INVENTION

Hereinafter, an embodiment of the present invention will be explained in detail, by taking a so-called laptop PC as an example, with reference to the accompanying drawings.

In the following description, some terms which respectively indicate specific directions ("up", "down", "left", "right" and other terms include their concept, "clockwise direction", "counterclockwise direction", for example) may be used. However, it is to be noted that those terms are used to facilitate understanding of the present invention with reference to the accompanying drawings. And, the present invention should not be interpreted in a limited way by meanings of those terms.

Figure 1:
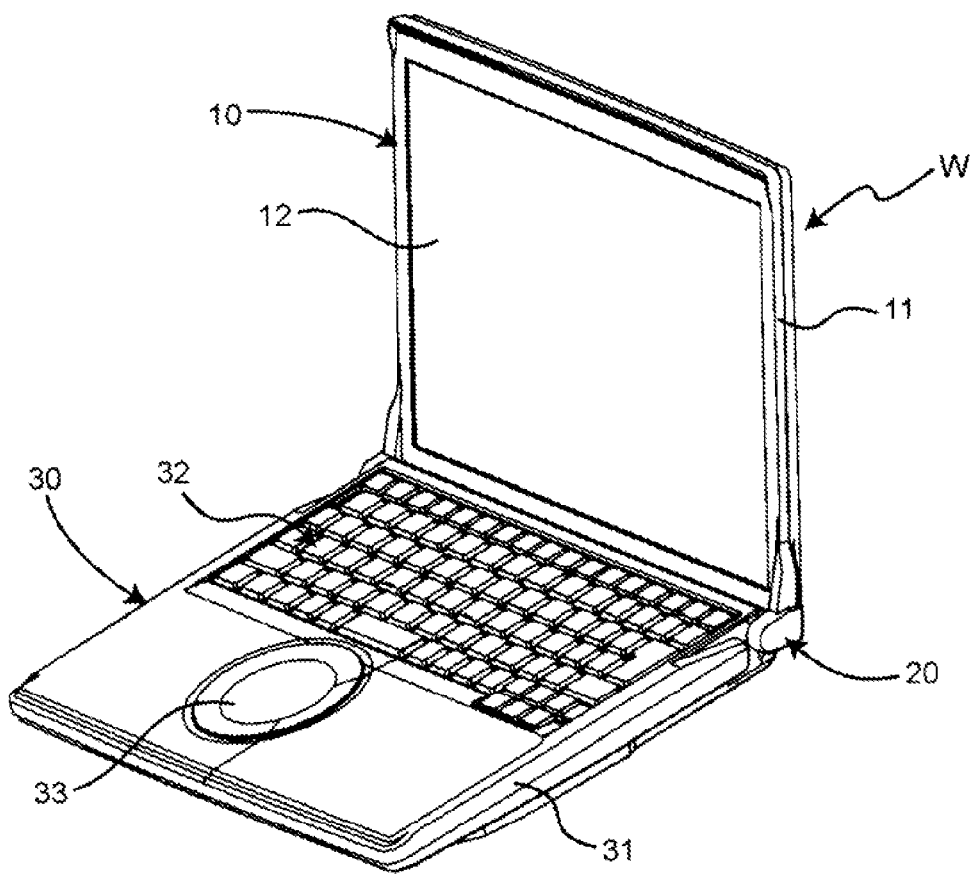
FIG. 1 is an overall perspective view of a laptop PC according to an embodiment of the present invention in an enabled state.
Figure 2:
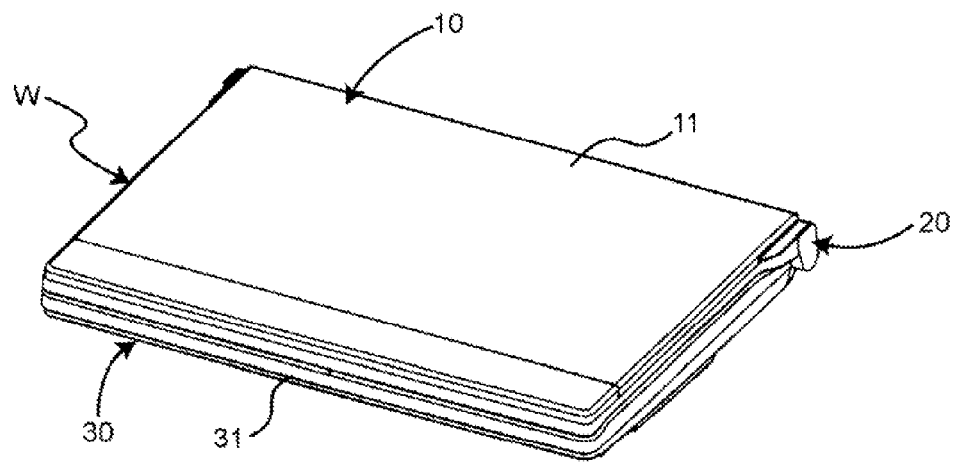
FIG. 2 is an overall perspective view of the laptop PC in a nonuse (closed) state.
Figure 3:
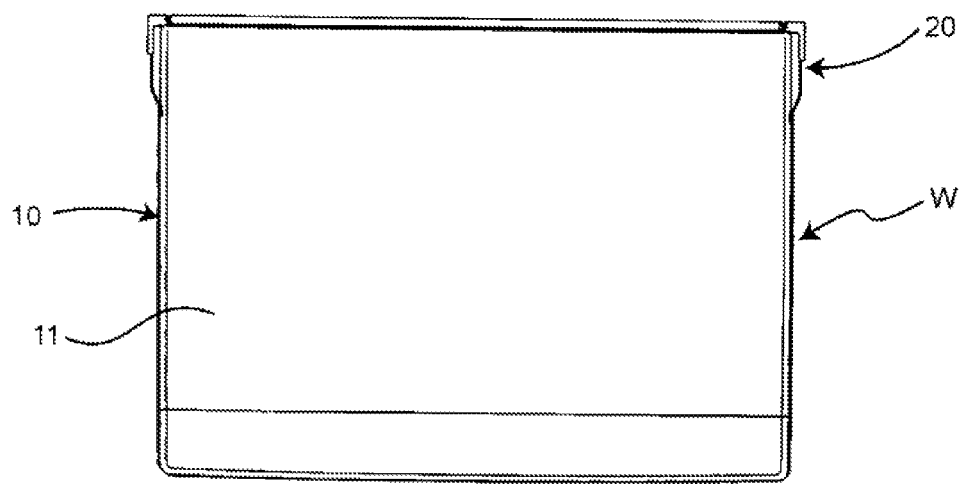
FIG. 3 is a plane view of the laptop PC in a nonuse (closed) state.
Figure 4:
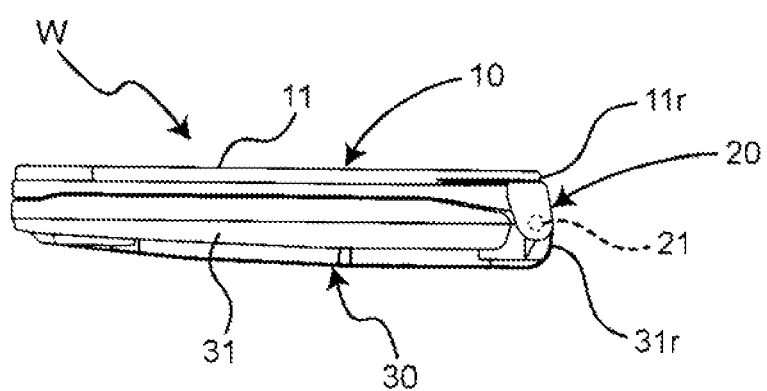
FIG. 4 is a side view of the laptop PC in a nonuse (closed) state.

FIGS. 1 and 2 are perspective views showing the laptop PC according to the present embodiment in an enable state and a nonuse (closed) state. And, FIGS. 3 and 4 are a plane view and a side view of the laptop PC in the nonuse (closed) state.

As shown in these drawings, the laptop PC W, as electronic equipment according to the present invention, is provided with a display section 10 having a display screen 12 such as liquid crystal type, and an operation control section 30 capable of generating a display signal which is to be inputted into the display section 10. The operation control section 30 includes an input device 32, such as a keyboard, signal processing circuits for generating display signals outputted to the display section based on input operations by the input device, a central processing unit (so-called CPU: not shown), and peripheral components thereof (also, not shown).

Also, a touch-pad 33 is provided on a near side viewing from a user in a state the user operates the laptop PC W, the user can conduct a cursor motion, a scroll of the display screen 12 and the like only by going over the touch-pad 33 from right to left or up and down with the finger.

The display section 10 is accommodated in a chassis 11 (a first chassis) for the display section side, and a periphery and a back face of the display section 10 are covered by the first chassis. On the other hand, the operation control section 30 is accommodated in a chassis 31 (a second chassis) for the operation control section side. And both the chassis are coupled to each other by a hinge mechanism 20 in a relatively openable and closable manner.

In more detail, both the first chassis 11 and the second chassis 31 have an overall basic shape of substantially rectangle in a planar view (that is, in a state of viewing from the front side thereof). And, one side (the first side) 11r of the first chassis 11 and one side (the first side) 31r of the second chassis 31 (that is, both the rear sides viewing from the user in a operating state where said user operates the laptop PC W) are coupled via the hinge mechanism 20. Thereby, the first chassis 11 and the second chassis 31 can move in a relatively openable and closable manner around a hinge axle 21 (refer to FIG. 4). It is to be noted that the "rectangle" includes a "square" as one configuration thereof in the present specification.

The laptop PC W can be driven by electricity supplied thereto from a rechargeable battery.

Figure 5:
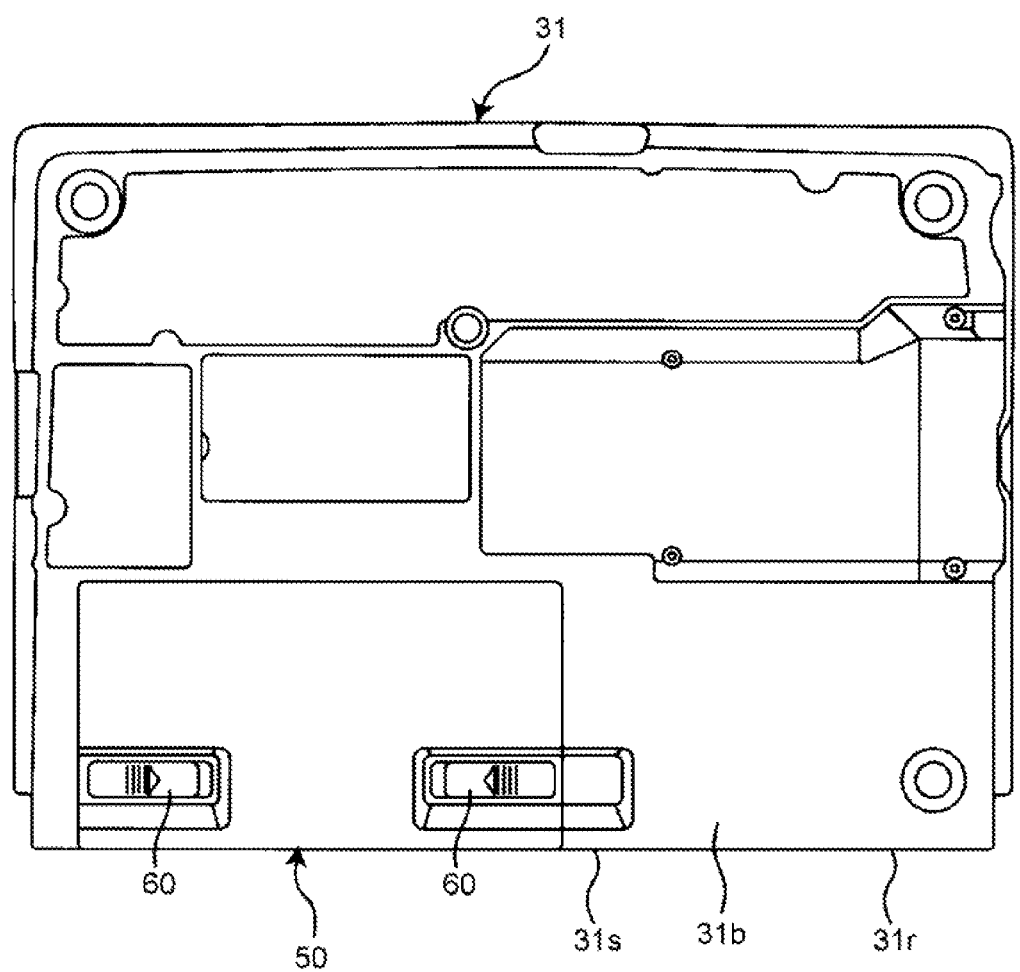
FIG. 5 is a bottom view of the laptop PC.
Figure 6:
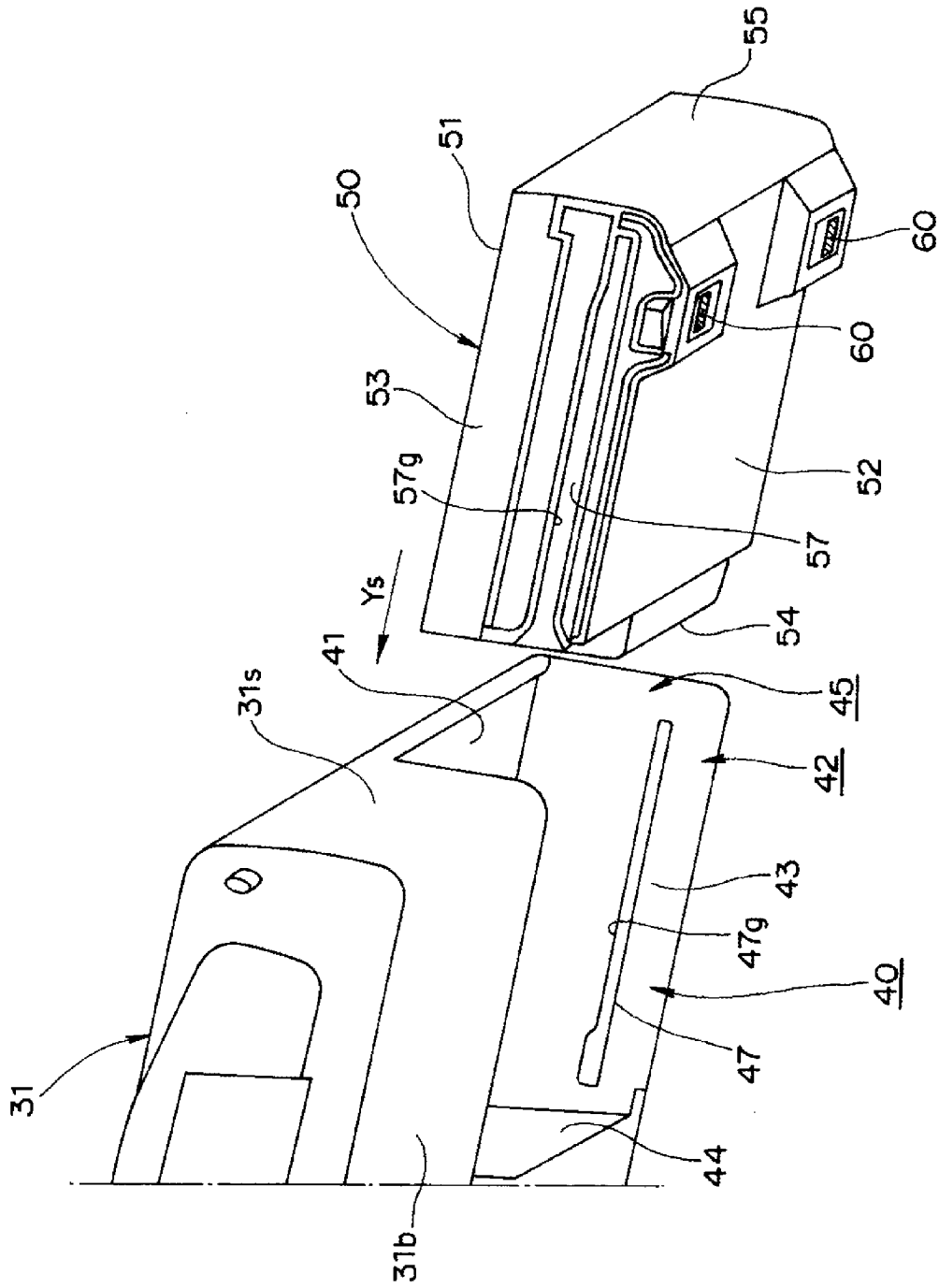
FIG. 6 is a perspective view schematically illustrating a battery pack and a housing section therefor according to an embodiment.

FIG. 5 is a bottom view of the laptop PC W, and FIG. 6 is a perspective view schematically illustrating a battery pack and a housing section therefor according to the present embodiment. As illustrated in these figures, in the present embodiment, the second chassis 31 is provided, in its bottom portion 31b, with a housing section 40 which houses the battery pack 50 formed from a unitized rechargeable battery, such that it is detacheable to (or removable from) the laptop PC W. The battery pack 50 is formed to basically have a substantially-rectangular parallelepiped shape in its entirety, and the housing section 40 is formed to have a concave portion which conforms thereto.

More specifically, as illustrated in FIG. 6, the battery pack 50 has a mounting flat surface 51 which is formed to be substantially flat and is mounted to oppose to a housing section ceiling portion which will be described later, a bottom-side flat surface 52 which is paired with the mounting flat surface 51, a pair of left and right side surfaces 53 and 53 positioned between both the flat surfaces 51 and 52, a back-side end surface 54 which is positioned at the end edge in the direction of insertion (the direction of an arrow Ys), further has a connection terminal (not illustrated) and is mounted to oppose to a housing section back wall which will be described later, and a front-side end surface 55 which is paired with the back-side end surface 54, such that the battery pack 50 is formed to basically have a substantially-rectangular parallelepiped shape in its entirety.

On the mounting flat surface 51, there is attached a name plate indicating the name of the maker, the model number, the fabrication lot number and further basic specifications and the like of the battery pack 50. Also, these nameplate information can be directly printed or displayed according to other methods, in the mounting flat surface 51.

On the other hand, the bottom portion 31b and a side portion 31s of the second chassis 31 are partially cut away and, thus, the housing section 40 has a ceiling wall portion 41 which corresponds to the mounting flat surface 51 of the battery pack 50, a bottom-side opening 42 which corresponds to the ceiling wall portion 41 and accommodates the bottom-side flat surface 52 of the battery pack 50, a pair of left and right side wall portions 43 which are positioned between the ceiling wall 41 and the bottom-side opening 42 and are opposed to the pair of left and right side surfaces 53 of the battery pack 50, a back wall portion 44 which has a connecter portion to be connected to the connection terminal in the back-side end surface 54 of the battery pack 50 and corresponds to the back-side end surface 54, and an inlet opening 45 which corresponds to the back wall portion 44 and accommodates the front-side end surface 55 of the battery pack 50, such that the housing section 40 is formed to have a concave shape which conforms to the rectangular parallelepiped shape of the battery pack 50. The battery pack 50 is inserted thereinto from the side of the rear portion of the chassis 31 through the inlet opening 45.

On the left and right side surfaces 53 of the battery pack 50 and on the left and right side wall portions 43 of the housing section 40, there are provided guide mechanisms which guide operations for inserting/pulling the battery pack 50 into and from the housing section 40. More specifically, the battery pack 50 is provided, in the respective side surfaces 53 thereof, with slot portions (slots) 57 extending in the direction of insertion, while the housing section 40 is provided, on the respective side walls 43 thereof, with guide rails 47 which are adapted to engage with the slot portions 57 and extend in the direction of insertion of the battery pack 50.

Further, by engaging the slot portions 57 in the battery pack 50 with the guide rails 47 in the housing section 40, it is possible to stably guide operations for inserting/pulling the battery pack 50 into and from the housing section 40. At this time, basically, the guided walls 57*g*, which are the upper surfaces of the slot portions 57, slide along the guide surfaces 47*g* which are the upper surfaces of the guide rails 47, thereby guiding inserting/pulling operations. The slot portions 57 in the battery pack 50 and the guide rails 47 in the housing section 40 correspond to "a guided portion" and "a guide means" described in the claims in the present application, respectively.

Further, in the present embodiment, the battery pack 50 is provided, in its bottom-side flat surface 52, with so-called slide knobs 60 which enable performing changeover operations by sliding them by a small amount along the bottom-side flat surface 52 of the battery pack 50, as a changeover operation device for locking/unlocking the battery pack 50 in the state where the battery pack 50 is housed in the housing section 40. Instead thereof, it is also possible to provide a lid member adapted to openably and closably cover the housing section 40, in addition to the battery pack 50, and to provide a slide knob having the same function on this lid member. The slide knobs 60 basically have the same structure and functions as those of a conventionally-known one and are not described and illustrated in detail.

Figure 7:
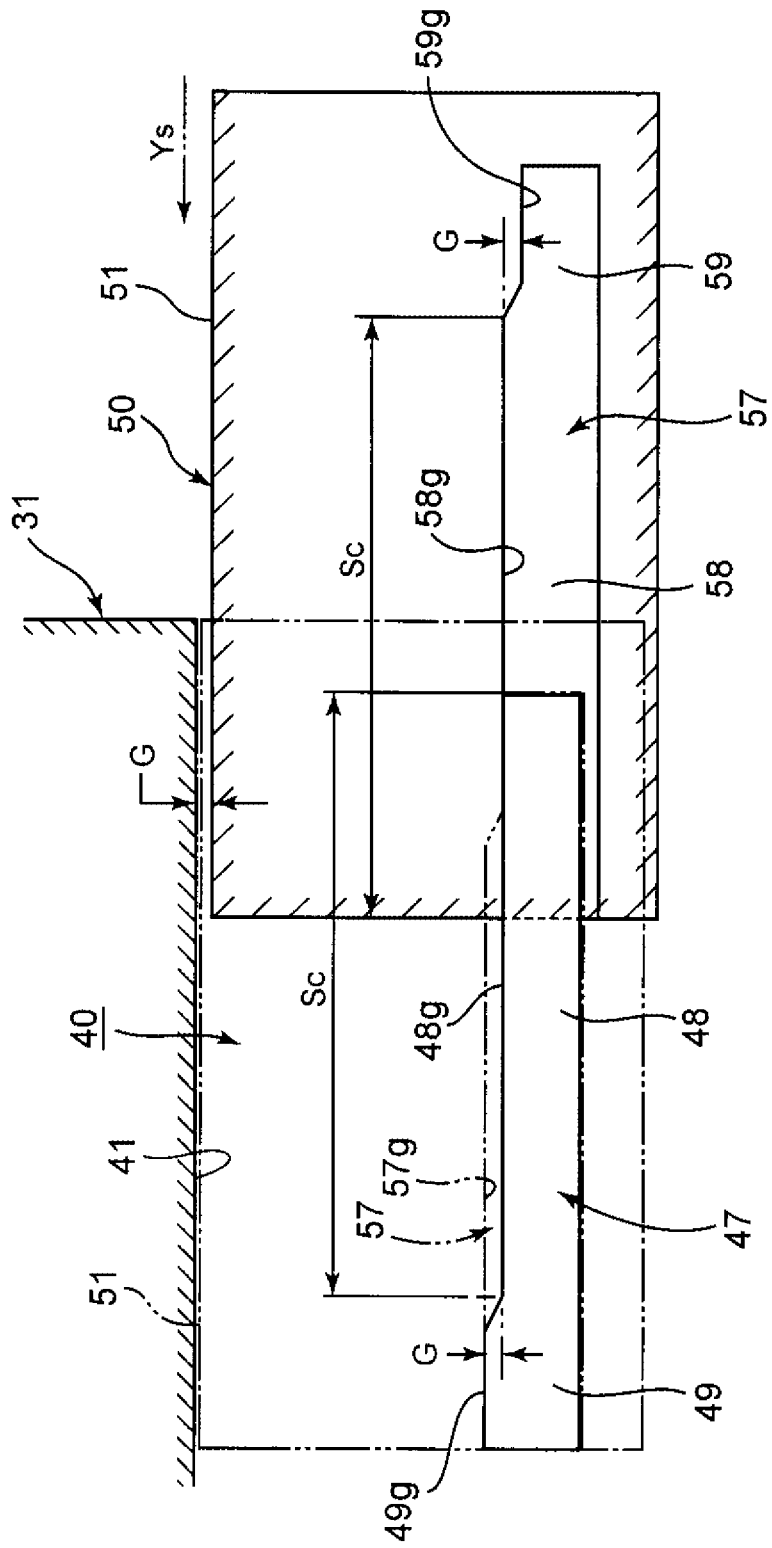
FIG. 7 is an enlarged explanation view illustrating slot portions in the battery pack and guide rails in the housing section.

In the present embodiment, in order to enable smoothly inserting and pulling the battery pack 50 into and from the housing section 40 while ensuring a state where the battery pack 50 is stably housed therein, as illustrated in detail in FIG. 7, the guide rails 47 are structured to engage with the slot portions 57 for guiding operations for inserting the battery pack 50, such that, until the amount of insertion of the battery pack 50 therein reaches a predetermined value Sc, a predetermined gap G is ensured between the mounting flat surface 51 of the battery pack 50 and the ceiling wall 41 of the housing section 40 and, when the amount of insertion of the battery pack 50 has reached the predetermined value Sc, the mounting flat surface 51 is closer to the ceiling wall 41 to eliminate the gap G.

More specifically, the guide rails 47 each include a first guide portion 48 (first guide rail portion) which relates to the amount of insertion of the battery pack 50 until the predetermined value Sc is reached, and a second guide portion 49 (second guide rail portion) which relates to the amount of insertion of the battery pack 50 after the predetermined value Sc has been reached. The guide surfaces 49*g* (namely, the guide rail upper surfaces) of the second guide portions 49 for the guided walls 57*g* of the slot portions 57 (namely, the upper walls of the slop portions) are set to be positioned closer by a distance G corresponding to the gap to the ceiling wall portion 41 of the housing section 40, than the guide surfaces 48*g* of the first guide portions 48 for the guided walls 57*g* of the slot portions 57.

By setting them as described above, when the battery pack 50 is inserted in the housing section 40, until the amount of insertion of the battery pack 50 therein reaches the predetermined value Sc, a predetermined gap (G) is ensured between the mounting flat surface portion 51 of the battery pack 50 and the ceiling wall portion 41 of the housing section 40 and, when the amount of insertion of the battery pack 50 has reached the predetermined value Sc (see the phantom line illustrated in FIG. 7), the mounting flat surface 51 is closer to the ceiling wall 41 to eliminate the gap (G), particularly in the back side provided with the second guide portions 49 in the direction of insertion of the battery pack 50, thereby guiding the operation for inserting the battery pack, preferably such that both the members 51 and 41 come into intimate contact with each other. Further, when the insertion operation has completed, it is possible to eliminate the gap between the mounting flat surface 51 of the battery pack and the ceiling wall 41 of the housing section 40, which can stably and certainly attain electric connection between the terminal included in the housing section 40 and the terminal included in the battery pack 50 without inducing "fluttering".

On the other hand, the slot portions 57 each include a first guided portion 58 (first guided) slot portion) which relates to the amount of insertion of the battery pack 50 until the predetermined value Sc is reached, and a second guided portion 59 (second guided slot portion) which relates to the amount of insertion after the predetermined value Sc has been reached. The guided walls 59*g* of the second guided portions 59 which are guided by the guide rails 47 are set to be positioned farther from the ceiling wall 41 of the housing section 40 by the distance G corresponding to the gap, than the guided walls 58*g* of the first guided portions 58.

By setting them as described above, when the battery pack 50 is inserted in the housing section 40, until the amount of insertion of the battery pack 50 therein reaches the predetermined value Sc, a predetermined gap (G) is ensured between the mounting flat surface 51 of the battery pack 50 and the ceiling wall portion 41 of the housing section 40 and, when the amount of insertion of the battery pack 50 has reached the predetermined value Sc (see the phantom line illustrated in FIG. 7), the mounting flat surface 51 is closer to the ceiling wall 41 to eliminate the gap (G), particularly in the front side provided with the second guided portions 49 in the direction of insertion of the battery pack 50, thereby guiding the operation for inserting the battery pack 50, preferably such that both the members 51 and 41 come into intimate contact with each other.

With this structure, until the predetermined value Sc which occupies most of the processing of inserting the battery pack 50 into the housing section 40 is reached, it is possible to maintain the mounting flat surface 51 of the battery pack and the ceiling wall 41 of the housing section at a separation relationship which maintains the gap G therebetween, which prevents important information about the battery (nameplate information) which is provided on the mounting flat-surface 51 of the battery pack through coating or attachment from being damaged due to sliding thereof against the ceiling wall portion 41 of the housing section.

Particularly, in the present embodiment, the guide surfaces 49*g* of the second guide portions 49 of the guide rails 47 for the guided walls 57*g* of the slot portions 57 are set to be positioned closer by the distance G corresponding to the gap to the ceiling wall portion 41 of the housing section 40, than the guide surfaces 48*g* of the first guide portions 48 for the guided walls 57g of the slot portions 57 and, further, the guided walls 59g of the second guided portions 59 of the slot portions 57 which are guided by of the guide rails 47 are set to be positioned farther from the ceiling wall portion 41 of the housing section 40 by the distance G corresponding to the gap, than the guided walls 58g of the first guided portions 58.

Accordingly, when the battery pack 50 is inserted into the housing section 40, the operation for inserting the battery pack 50 is guided such that, when the amount of insertion of the battery pack 50 therein has reached the predetermined value Sc, the mounting flat surface portion 51 is closer to the ceiling wall 41 to eliminate the gap (G), in both the back side and the front side in the direction of insertion of the battery pack, which realizes a more stable insertion operation and also realizes a state where the battery pack 50 is stably housed therein, thereby stably and certainly attaining electric connection between the terminal included in the housing section 40 and the terminal included in the battery pack 50 without inducing "fluttering".

Furthermore, in the present embodiment, even though the nameplate (not illustrated) of the battery pack 50 is attached to the mounting flat-surface 51 of the battery pack 50, even if the battery pack 50 is repeatedly inserted and pulled into and from the housing section 40, it is possible to suppress the occurrence of inconveniences, such as exfoliation of the nameplate, scrapes of the nameplate information in the nameplate attached to the mounting flat-surface 51, which would make it hard to see it.

Further, in the aforementioned description, there is provided a structure for guiding operations for inserting the battery pack 50 such that the mounting flat-surface portion 51 gets closer to the ceiling wall portion 41 to eliminate the gap (G), both in the back side and the front side in the direction of insertion of the battery pack, by contriving the positions of the guide surfaces 49g and the guided walls 59g with respect to the ceiling wall 41 of the housing section 40, regarding both the second guide portions 49 of the guide rails 47 provided in the housing section 40 and the second guided portions 59 of the slot portions 57 provided in the battery pack 50. However, depending on various conditions, it is also possible to employ the aforementioned structure, only in the back side or the front side in the direction of insertion of the battery pack.

Further, while in the aforementioned description, a laptop PC has been exemplified, the present invention is not intended to be limited to this case and also can be effectively applied to other various information-processing equipments which employ battery packs.

As described above, the present invention is not limited to the aforementioned embodiments and modification examples, and it goes without saying that various changes and modifications of designs and the like can be made without departing from the split thereof.

The present invention can be effectively utilized, as a structure for housing a battery pack in information-processing equipments, such as a laptop PC.

What is claimed is:
1. Information-processing equipment, comprising:
a battery pack having a substantially-rectangular parallelepiped shape, the battery pack having a mounting end surface, first and second side surfaces and a mounting flat surface, the first and second side surfaces having first and second slots, respectively; and
a chassis having a housing section configured to detachably house the battery pack,
wherein the housing section is a partial cut away at a bottom portion and a side portion of the chassis,
wherein the housing section comprises a back wall, first and second side walls, a ceiling wall, and an opening portion configured to enable insertion of the battery pack in an insertion direction from a side of the chassis such that, when the battery pack is housed in the housing section, the back wall faces the mounting end surface of the battery pack, the first and second side walls face the first and second side surfaces of the battery pack, respectively, and the ceiling wall faces the mounting flat surface of the battery pack, the insertion direction being perpendicular to the back wall of the housing section,
wherein the first and second side walls of the housing section include first and second guide rails, respectively, the first and second guide rails configured to guide insertion of the battery pack, the first and second guide rails being configured to engage with the first and second slots, respectively,
wherein the first and second slots extend in the insertion direction,
wherein each of the first and second slots includes
an opened end,
a closed end opposed to the opened end,
a first guided slot portion having a first slot-width, and
a second guided slot portion having a second slot-width narrower than the first slot-width,
wherein a ceiling surface of the second guided slot portion is connected to a ceiling surface of the first guided slot portion through a tapered part, and wherein a bottom surface of the first guided slot portion and a bottom surface of the second guided slot portion form one straight, flat surface,
and wherein the first guided slot portion extends from the opened end to a first end of the tapered part, and the second guided slot portion extends from a second end of the tapered part to the closed end,
wherein each of the first and second guide rails includes
a first end and a second end opposed to each other in the insertion direction,
a first guide rail portion having a first rail-width, and
a second guide rail portion having a second rail-width broader than the first rail-width,
wherein an upper surface of the second guide rail portion is connected to an upper surface of the first guide rail portion through a flared part, and wherein a lower surface of the first guide rail portion and a lower surface of the second guide rail portion form one straight, flat surface,
and wherein the first guide rail portion extends from the first end of the guide rail to a first end of the flared part, and the second guide rail portion extends from a second end of the flared part to the second end of the guide rail,
wherein when the battery pack is housed in the housing section, the first and second guide rails are engaged with the first and second slots, respectively, such that for each guide rail and respective slot engaged therewith,
the ceiling surface of the second guided slot portion is fitted to the upper surface of the first guide rail portion,
the bottom surface of the second guided slot portion is fitted to the lower surface of the first guide rail portion,
the ceiling surface of the first guided slot portion is fitted to the upper surface of the second guide rail portion, and
the bottom surface of the first guided slot portion is fitted to the lower surface of the second guide rail portion, wherein in each of the first and second slots, the first guided slot portion is configured and arranged so as to be guided by the respective guide rail before the second guided slot portion is guided by the respective guide rail during insertion of the battery pack, and wherein the first slot-width of the first guided slot portion and the second slot-width of the second guided slot portion are widths in a direction perpendicular to the mounting flat surface of the battery pack.

2. The information-processing equipment according to claim 1, wherein when the battery pack is housed in the housing section, the first and second guide rails are engaged with the first and second slots, respectively, such that for each guide rail and respective slot engaged therewith, a portion of the ceiling surface of the first guided slot portion is opposed to a portion of the u s ser surface of the first uide rail s ortion at a distance and the bottom surface of the first guided slot portion is fitted to the lower surface of the first guide rail portion, wherein in each of the first and second guide rails, the first guide rail portion is configured to engage with the first guided slot portion of the respective slot before the second guide rail portion engages with the first guided slot portion during insertion of the battery pack, and wherein the first rail-width of the first guide rail portion and the second rail-width of the second guide rail portion are widths in a direction perpendicular to the ceiling wall of the housing section.

3. The information-processing equipment according to claim 2, wherein a length of the first guide rail portion in the insertion direction of the battery pack is longer than a length of the second guided slot portion in the insertion direction.

* * * * *